(12) United States Patent
Horiuchi et al.

(10) Patent No.: US 8,786,868 B2
(45) Date of Patent: Jul. 22, 2014

(54) OUTPUT CONTROL DATA GENERATING DEVICE, DATA GENERATING METHOD, AND PROGRAM

(75) Inventors: Yukiharu Horiuchi, Chino (JP); Yasuhiro Takeuchi, Sakaki-machi (JP); Hiroyuki Nagasawa, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 843 days.

(21) Appl. No.: 12/818,267

(22) Filed: Jun. 18, 2010

(65) Prior Publication Data

US 2010/0328694 A1    Dec. 30, 2010

(30) Foreign Application Priority Data

Jun. 29, 2009    (JP) ................................. 2009-153341

(51) Int. Cl.
*G06K 15/02*    (2006.01)

(52) U.S. Cl.
USPC ....................................................... 358/1.11

(58) Field of Classification Search
USPC ........................................................ 358/1.1
See application file for complete search history.

(56) References Cited

U.S. PATENT DOCUMENTS

| | | | |
|---|---|---|---|
| 7,561,283 B2 | 7/2009 | Kitahara et al. | |
| 2003/0002063 A1* | 1/2003 | Oomura et al. | 358/1.11 |
| 2003/0046314 A1 | 3/2003 | Morooka | |
| 2007/0002373 A1* | 1/2007 | Yamada | 358/1.15 |

FOREIGN PATENT DOCUMENTS

| | | |
|---|---|---|
| JP | 2944338 A | 5/1994 |
| JP | 06-183071 A | 7/1994 |
| JP | 3896683 A | 9/1999 |
| JP | 2000-207392 A | 7/2000 |
| JP | 2001-022338 A | 1/2001 |
| JP | 2002-175171 A | 6/2002 |
| JP | 2003-058528 A | 2/2003 |
| JP | 2003-323282 A | 11/2003 |
| JP | 2004-348486 A | 12/2004 |
| JP | 2008-282329 A | 11/2008 |

* cited by examiner

*Primary Examiner* — Marivelisse Santiago Cordero
*Assistant Examiner* — Mesfin Getaneh
(74) *Attorney, Agent, or Firm* — Nutter McClennen & Fish LLP (57) ABSTRACT

An output control data generating device for controlling an output device includes a character selection unit that receives a selection of a desired character code set and a desired character from a group containing at least one character code set that can be used on the output control data generating device; a font selection unit that receives a selection of output font data, which is information for outputting the selected character to the output device, from among a plurality of different font groups disposed to the output device; a mapping unit that produces a font group definition file that stores the selected character mapped to the output font data; and an output control unit that controls output to the output device, using the font group definition file.

15 Claims, 11 Drawing Sheets

OUTPUT CONTROL DATA GENERATING DEVICE, DATA GENERATING METHOD, AND PROGRAM

BACKGROUND

1. Technical Field

The present invention relates to an output control data generating device that is used to control an output device.

2. Related Art

A printer having plural code pages that store data for a plurality of font patterns (font output data such as bitmap data for each character) is known from Japanese Unexamined Patent Appl. Pub. JP-A-H06-183071, for example. There are two methods of printing on such a printer: using a printer driver that runs on a personal computer to send the screen font data used on the personal computer to the printer, or substituting the screen fonts with printer fonts ("output font data") that are stored on a code page in the printer. While the latter method improves the printing speed, it requires a 1:1 relationship between the character code set of the screen font and the code page storing the output font data.

However, with the adoption of a character code set, such as Unicode, that contains a plurality of character code sets covering multiple languages and addresses all characters with a single character code system, technology enabling an application that runs on a personal computer to freely use any desired characters and to print those characters using the font pattern data stored in the printer without being limited by the code pages stored in the printer is desirable.

This problem is not limited to outputting data to printers and other printing devices, and is common to outputting characters to other types of output devices including personal computer display devices.

See also Japanese Unexamined Patent Appl. Pub. JP-A-2004-348486, Japan Patent No. 2944338, and Japan Patent No. 3896683.

SUMMARY

The present invention teaches technology enabling outputting data from an output control data generating device using the output font data of an output device regardless of the type of character code set that is used.

The invention solves at least part of the problem of the foregoing prior art by means of the embodiments and variations of the invention described below.

A first aspect of the invention is an output control data generating device for controlling an output device, including: a character selection unit that receives a selection of a desired character code set and a desired character from a group containing at least one character code set that can be used on the output control data generating device; a font selection unit that receives a selection of output font data, which is information for outputting the selected character to the output device, from among a plurality of different font groups disposed to the output device; a mapping unit that produces a font group definition file that stores the selected character mapped to the output font data; and an output control unit that controls output to the output device using the font group definition file.

Because output is controlled in this aspect of the invention using a font group definition file that maps characters that can be used on the output control data generating device to output font data, data on the output control data generating device can be output using the output font data of the output device regardless of the type of character code set used.

A second aspect of the invention is the output control data generating device described in the foregoing first aspect of the invention wherein the plurality of different font groups is divided into a plurality of code pages corresponding to the plurality of font groups, and the font group definition file includes code page information; and the output control unit controls output to a printing device used as the output device by referencing the font group definition file, finding the output font data to which is mapped the character used in the data to be output, and asserting a print command that converts the characters used in the data to be output to the output font data.

This aspect of the invention controls printing by outputting a print command that converts the characters used in the data to be output to output font data, and can therefore output data from the output control data generating device using the output font data of the output device regardless of the type of character code set used. In addition, output font data can be used from the plural code pages of plural different font groups resident on the output device.

A third aspect of the invention is the output control data generating device described in the foregoing second aspect, further including a registration unit that receives input of user-defined output font data from an input means of the output control data generating device, and stores the input output font data on a blank page, which is a predefined empty storage space in the code pages.

Because the code pages include blank pages for storing user-defined output font data, the user can register any desired character and user convenience can be improved.

A fourth aspect of the invention is the output control data generating device according to the foregoing third aspect further including an output font data storage unit that stores the user-defined output font data. In this aspect of the invention the registration unit also stores the output font data that was input in the output font data storage unit, and the output control unit also sends the output font data mapped to the character stored in the output font data storage unit together with the print command to the printing device when the character used in the data to be output is data mapped to the blank page.

When the character code denoting a character used in the data to be output is information mapped to a blank page, this aspect of the invention sends the user-defined output font data with the print command to the printer. As a result, printing using user-defined characters is possible even if the printer does not have the user-defined output font data, such as when the printer is different from the printer in which the user-defined output font data was registered. As a result, user convenience can be improved.

It will be obvious to one with ordinary skill in the related art that the invention can be achieved in many different ways. For example, in addition to an output control data generating device, an output control data generating system, and an output control data generating method, the invention can also be rendered as a computer program rendering the function of these devices or methods, and as a recording medium on which the computer program is recorded.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

A. Embodiment 1

Figure 1:
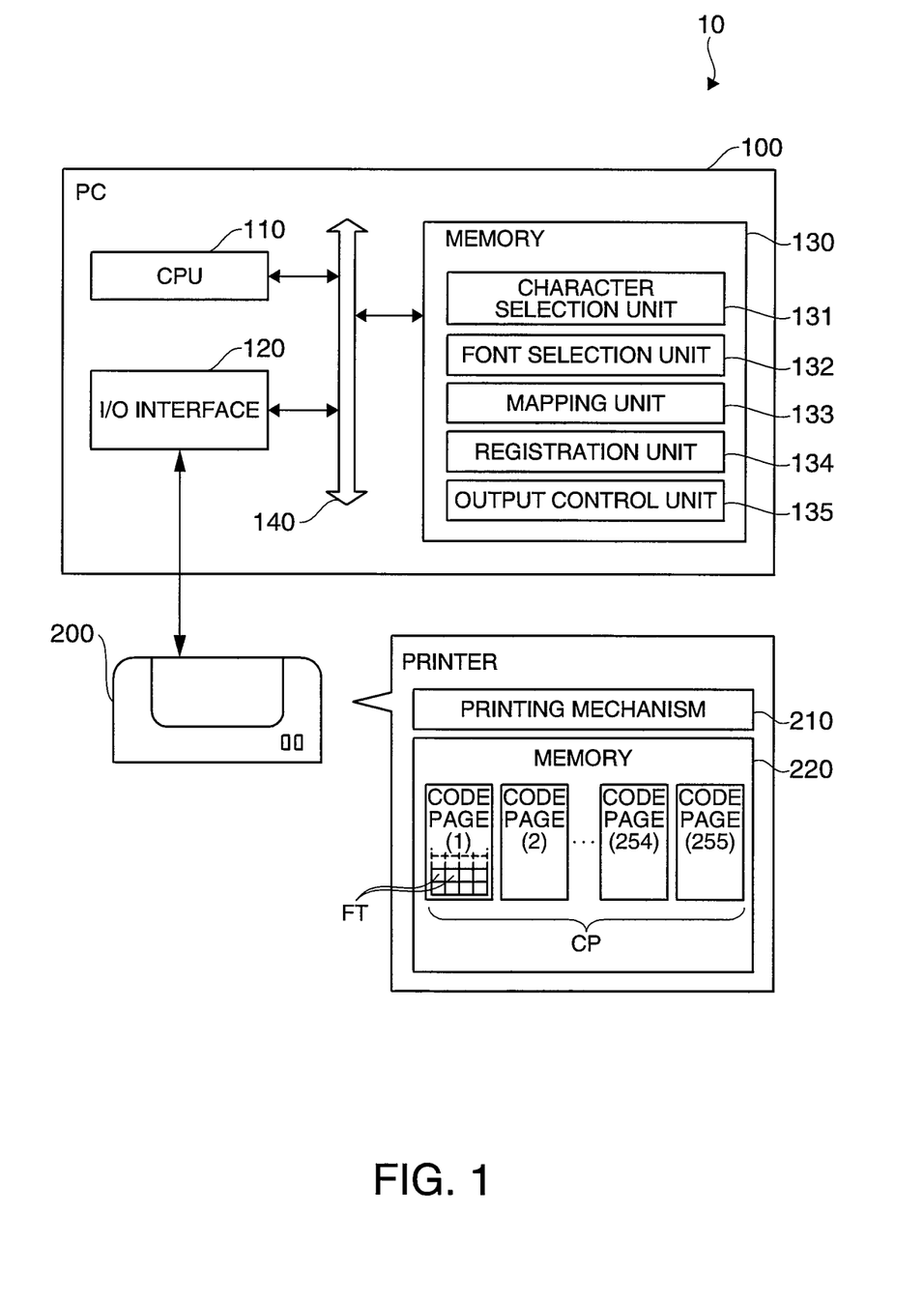
FIG. 1 is a block diagram showing a printing system according to a preferred embodiment of the invention.

FIG. 1 is a block diagram showing the configuration of a printing system 10 according to a first embodiment of the invention. This printing system 10 includes a personal computer (PC) 100 as an output control data generating device, and a printer 200 as an output device.

The PC 100 includes a CPU 110, an input/output (I/O) interface 120, and memory 130. The CPU 110, I/O interface 120, and memory 130 are connected to each other over a bus 140. The CPU 110 is an electronic circuit for controlling the various parts of the PC 100. The memory 130 may be rendered using a storage device not shown such as a hard disk drive, flash memory, ROM, or RAM, and includes a character selection unit 131, a font selection unit 132, a mapping unit 133, a registration unit 134, and an output control unit 135. These software modules stored in the memory 130 are executed by the CPU 110 and thereby function as the processing units described below. Note that an operating system (OS) and an application program (such as a word processor or other document creation program) are also stored in memory 130.

The printer 200 has a printing mechanism 210 and memory 220. The printing mechanism 210 is a mechanism that receives commands from the output control unit 135 and prints text or images on a print medium such as printing paper.

The memory 220 is rendered, for example, by a ROM, RAM, or flash memory device not shown, and stores plural different types of font groups CP. One "font group" is a set of characters having the same typographic design, such as "MS Gothic." A plurality of areas, called code pages, for storing these font groups are rendered in memory 220. In the example shown in FIG. 1, there are 255 code pages identified by page numbers 1 to 255. The pages with page numbers 254 and 255 are reserved pages, that is, blank pages, for storing user-defined fonts. Note that a "font" as used herein is data representing the shape of a character when the character is output to the printing mechanism 210, and a plurality of fonts FT are stored on one code page. These fonts are also referred to herein as "output font data." This output font data is stored in memory 220 in rewritable nonvolatile flash memory.

Figure 2:
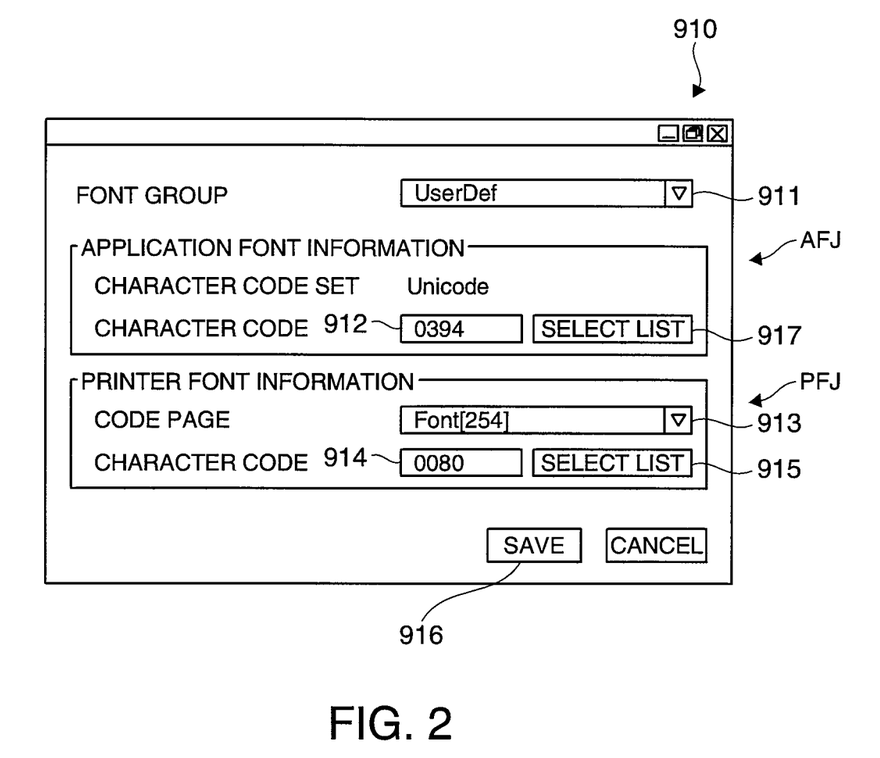
FIG. 2 describes an example of font mapping.

FIG. 2 describes an example of font mapping. The user first maps a font. More specifically, the user operates the PC 100 to display the mapping window 910 (input means) shown in FIG. 2. The mapping window 910 includes a font group selection unit 911, an application font information AFJ block as a character selection unit, a printer font information PFJ block as a font selection unit, and a save button 916. The name of a font group used in the PC 100 is selected in the font group selection unit 911. In the example shown in FIG. 2, "User-Def" ("user-defined") is specified as the name of the font group. Note that the font group selection unit 911 may be rendered to enable selection from a list as shown in FIG. 2, or so that the font group can be input by the user.

Any desired character can be selected from among the Unicode characters that can be used on the PC 100 in the application font information AFJ. The application font information AFJ includes a character code set field, a character code field 912, and a list selection button 917. In the example shown in FIG. 2 the character code set is fixed and is set to Unicode. The number to which a user-defined character is to be assigned is selected from among the character codes in the character code set specified in the character code set field (that is, Unicode in this example) and input to the character code field 912. In the example shown in FIG. 3, Unicode code point 0394 is selected in the application font information AFJ.

Figure 3:
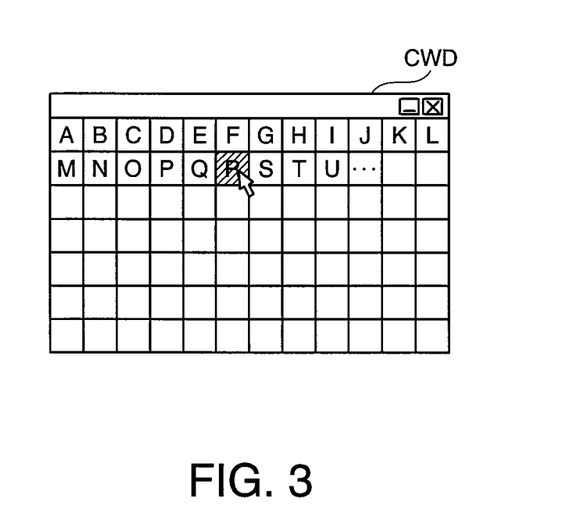
FIG. 3 describes an example of a list selection window.

FIG. 3 shows an example of a list selection window. The list selection window helps the user find the desired character. The list selection window CWD shown in FIG. 3 is displayed when the list selection button 917 (FIG. 2) is pressed. A list of all characters contained in the character code set selected in the character code set field is displayed in the list selection window CWD. When the user clicks on a desired character in this list, the number indicating the location of that character in the character code set is automatically entered in the character code field 912. This is desirable because the user can set the application font information AFJ without knowing the arrangement of the character code set. Note, further, that the list selection button 917 can be omitted.

The output font data for outputting the character selected in the application font information AFJ (also referred to as the "selected character" below) to the printer 200 is selected and set in the printer font information PFJ. The printer font information PFJ includes the code page 913, character code number 914, and a list selection button 915. The number of the code page where the output font data FT is stored is selected in the code page 913 field. The number denoting the location on the code page where the output font data for the selected character is stored is input to the code number 914. In the example shown in FIG. 3, the character code 0080 on code page 254 is specified as the printer font information PFJ.

The list selection button 915 is a button for displaying the list selection window that supports inputting a number to the code number 914. The list selection window is an input support window similar to that shown in FIG. 3. However, a list of the fonts already stored in the code page indicated in the code page 913 field is displayed in the list selection window displayed by pressing the list selection button 915. When the user clicks on a desired font in this list, the number indicating the location of that font in the code page is input as the code number 914. This configuration is desirable because the user can specify the printer font information PFJ without knowing the arrangement of the fonts in the code page. Note that the list selection button 915 may also be omitted.

Next, by pressing the save button 916, the mapping unit 133 generates a map file that stores the character specified in the application font information AFJ mapped to the output font data specified in the printer font information PFJ. Generating this map file is described in detail below.

Figure 4:
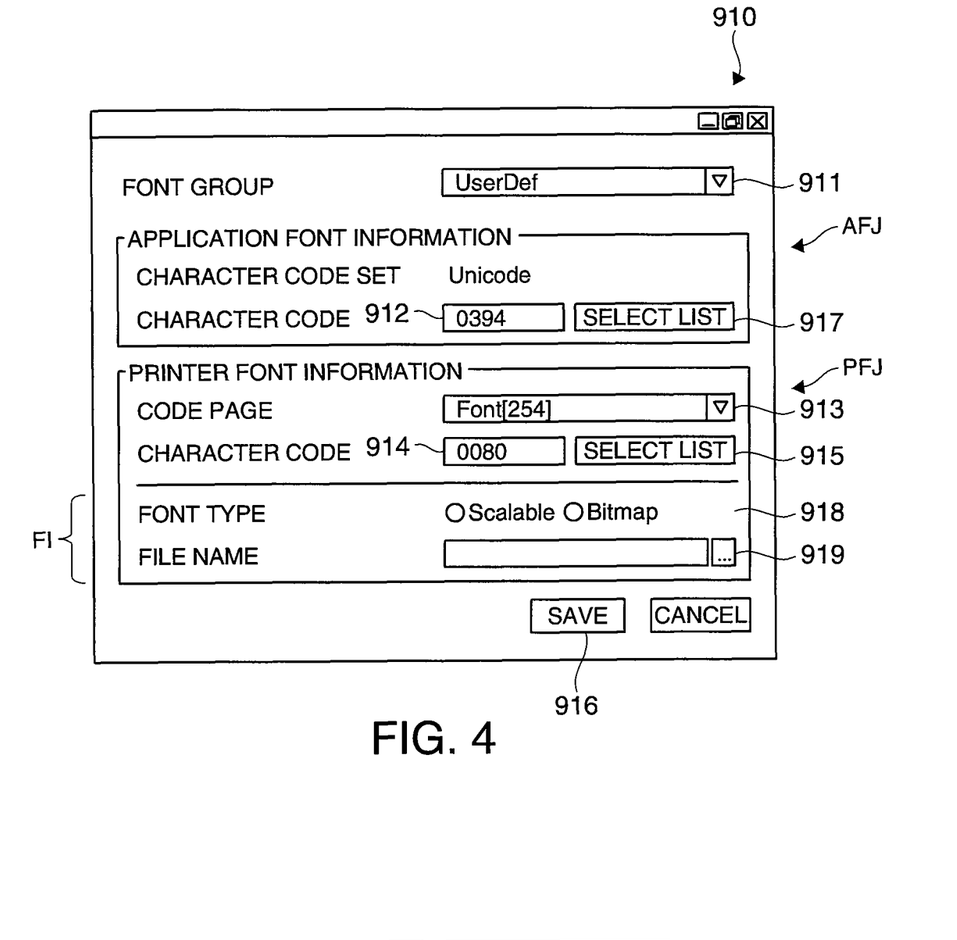
FIG. 4 describes another example of font mapping.

FIG. 4 shows another example of font mapping. In the example shown in FIG. 4, a user-defined font can be stored in the printer 200 in conjunction with font mapping. A user-defined font is stored in the printer when, for example, the font desired by the user is not stored in a code page already stored in the printer 200 (page numbers 1-253). This user-defined font (output font data) is stored on a blank page (a page with page number 254 or 255) in the printer 200. Because nothing is stored on these blank pages by default, the user can register any desired character for greater convenience.

In the example shown in FIG. 4, the printer font information PFJ also includes a registered font data block FI for inputting the user-defined output font data. The registered font data block FI includes a font type selector 918 and a file name selector 919. The type of user-defined font to be registered, that is, a scalable font or a bitmapped font, is selected in the font type selector 918. The file defining the registered user-defined font is selected in the file name selector 919.

When a font is saved in the printer 200, the user specifies the output font data to be saved in the registered font data block FI. When the font is not to be saved in the printer 200, the registered font data block FI may be left blank. Note that for usability, the input items in the registered font data block FI are preferably enabled only when a blank page has been selected in the code page 913 field.

When the save button 916 is pressed in the example shown in FIG. 4, the registration unit 134 sends a save command to the printer 200 to store the output font data specified in the registered font data block FI to the location on the blank page specified by the content input to the code page 913 field and the code number 914. The mapping unit 133 also generates a font map file that stores the character specified in the application font information AFJ mapped to the output font data specified in the printer font information PFJ. This aspect of the invention can improve convenience and usability because both registering a font in the printer 200 and font mapping can be done in a common window. Note, further, that a configuration that can store a user-defined font in the printer 200 without using a mapping window 910 is also conceivable.

Figure 5:
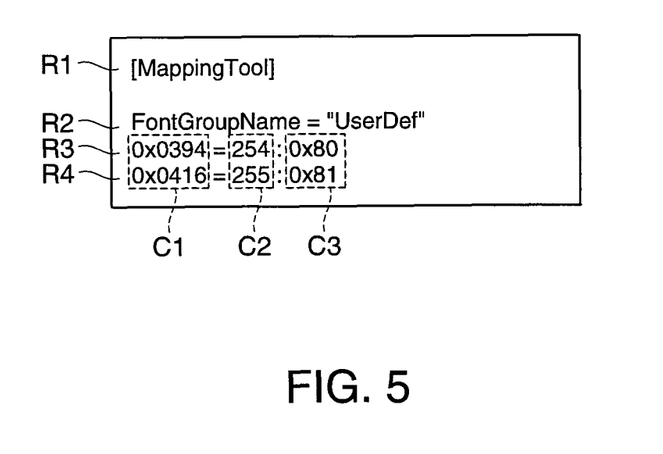
FIG. 5 describes an example of a font map file as a font group definition.

FIG. 5 describes an example of a map file as a font group definition file.

When the save button 916 is pressed in the mapping window 910, the mapping unit 133 generates a map file based on the content input in the mapping window 910. The map file is a definition file that defines a font group that can be used on the PC 100 by storing the character specified in the application font information AFJ and the output font data specified in the printer font information PFJ mapped to a particular font group. This map file is stored in the output control unit 135 (FIG. 1).

Element R1 is the map file header. Element R2 is the font group name, which is "UserDef" in this example. Elements R3 and R4 each define a mapped pair including the character defined in the application font information AFJ (FIG. 2) and the output font data defined in the printer font information PFJ (FIG. 2). Each mapped pair is defined by the following rules. The character code specified in the character code 912 field of the application font information AFJ is stored in column C1. The number indicating the code page specified in the code page 913 field in the printer font information PFJ is stored in column C2. The number specified in the code number 914 field of the printer font information PFJ indicating the location of the character on the code page is stored in column C3.

As a result, element R3 shows that the character denoted by Unicode code point 0394 is mapped to character code 80 on code page 254. Likewise, element R4 shows that the character denoted by Unicode code point 0416 is mapped to character code 81 on code page 255. Note that "0x" used in column C1 and column C3 is a prefix denoting hexadecimal notation.

Note that when a plurality of user-defined fonts are defined in the mapping window 910 using the same font group name as a font group name already stored in the map file, the mapping unit 133 may add the mapped pairs to the appropriate locations in the map file and update the map file. FIG. 5 shows an example in which this registration process was executed twice, that is, to create element R3 and element R4.

Figure 6:
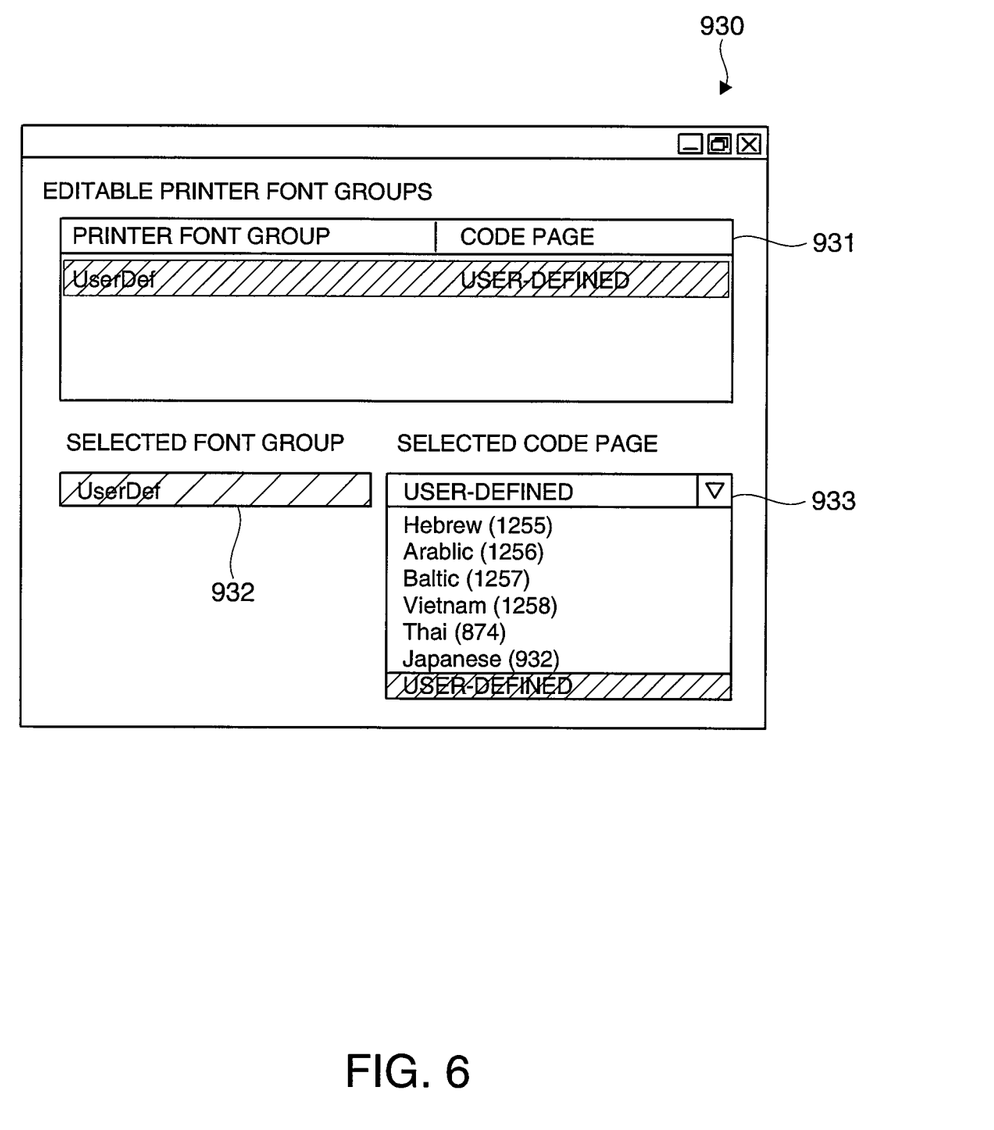
FIG. 6 describes an example of registering a font group in a printer.

FIG. 6 describes an example of registering a font group in a printer. After font mapping is completed, the user stores the font group resulting from the mapping operation in the printer 200. More specifically, the user operates the PC 100 to display a printer configuration window 930. The printer configuration window 930 includes a defined group display pane 931, a font group selector 932, and a code page selector 933. A list of font groups that are already stored in the PC 100 and can be changed in the printer 200 is presented in the defined group display pane 931. When the user selects a font group to be changed from the defined group display pane 931, the definitions of the selected font group are presented in the font group selector 932 and the code page selector 933. When a user-defined font group is saved in the printer 200 in this embodiment of the invention, the user selects "User-Defined" from the code page selector 933.

Figure 7:
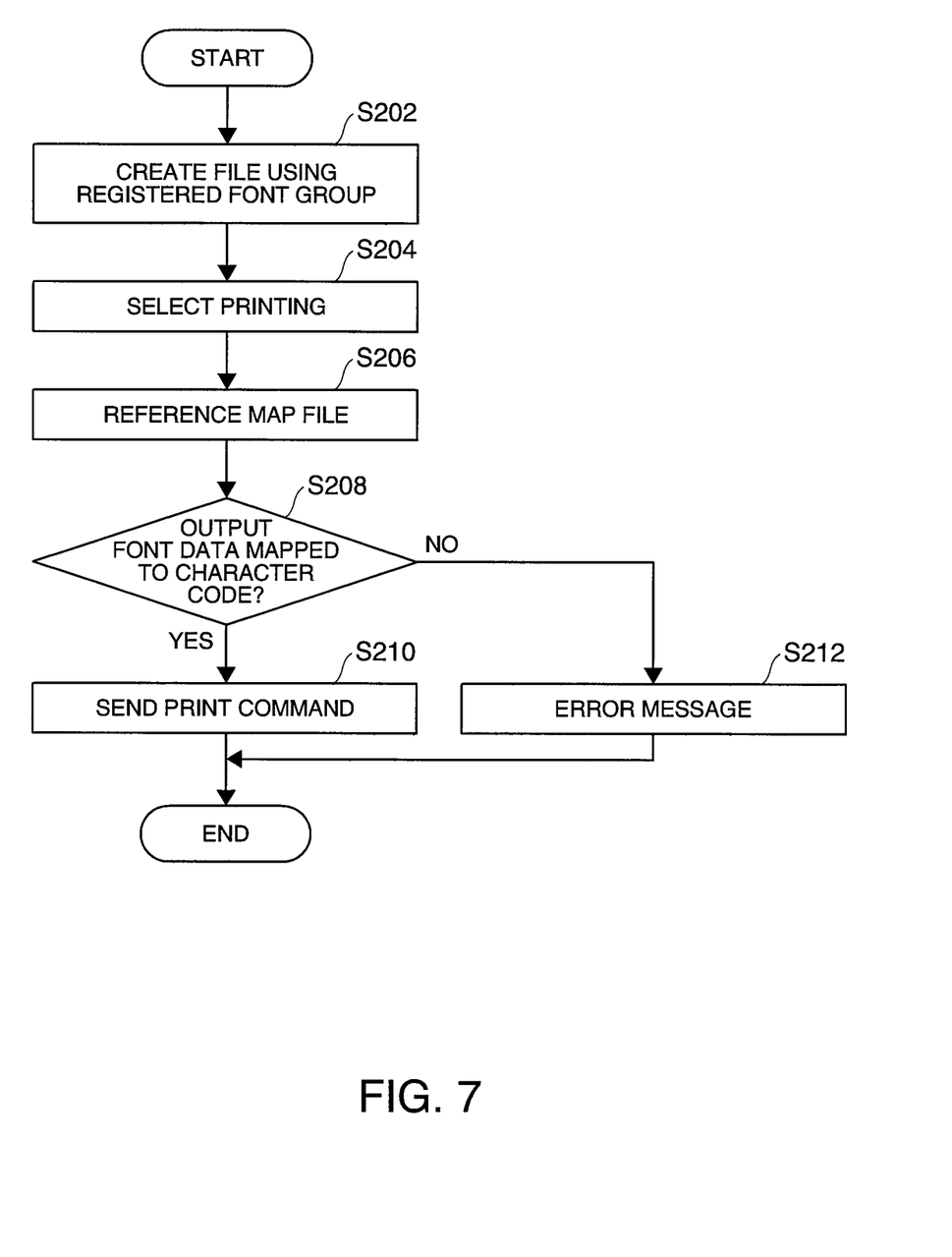
FIG. 7 is a flow chart describing a printing process in a first embodiment of the invention.

FIG. 7 is a flow chart showing the steps of the printing process in this first embodiment of the invention. First, in step S202, the user creates a file (such as a text file) using a registered font group. Then in step S204 the user asserts a command to print the selected output file. When the printing command is asserted, the output control unit 135 of the PC 100 reads the map file stored in an internal storage area and searches the output font data. More specifically, the character code of every character used in the output file is compared with column C1 in the map file (FIG. 5) to find the output font data (elements C2 and C3 in FIG. 5) for each matching element. As a result, the output control unit 135 can know where the characters used in the output file are stored on which code page in the printer 200.

Next, in step S208, the output control unit 135 determines if the character codes of all characters used in the output file are mapped to output font data in the map file. If output font data for all character codes is in the map file, the output control unit 135 generates a print command that converts all character codes used in the output file to the corresponding output font data (elements C2 and C3 in FIG. 5), and sends the resulting print command to the printer 200 (step S210). If output font data for all character codes is not contained in the map file, the output control unit 135 outputs an error message and ends the process (step S212). Note that instead of outputting an error message in step S212, the output control unit 135 may generate and output a print command using predetermined substitute characters.

Figure 8:
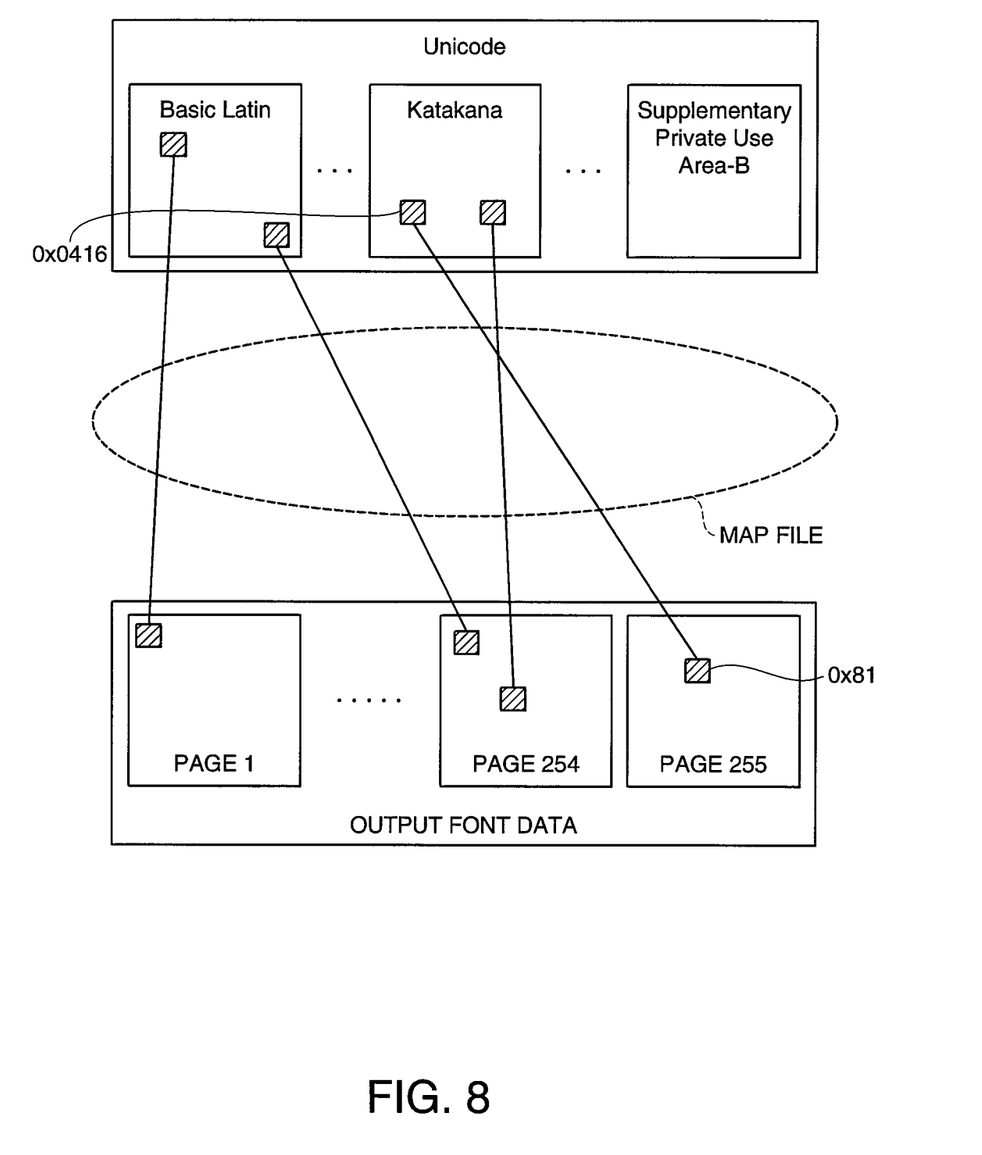
FIG. 8 conceptually describes the effect of the first embodiment.

FIG. 8 conceptually describes the effect of the first embodiment of the invention. As shown in FIG. 8, Unicode has a single unified code system covering multiple character code sets for multiple languages. Therefore, when data produced in Unicode (data combining both characters from the Unicode Basic Latin and katakana code pages, for example) is to be printed using the output font data of the printer 200, there is preferably a 1-to-many relationship between Unicode and the code pages storing the output font data. In the first embodiment of the invention, output to the printer 200 is controlled using the font group definition (map file) correlating Unicode code points to the output font data used in the printer 200. As a result, data on the PC 100 can be output using the output font data of the printer 200 regardless of the type of character code set that is used. In addition, the printer 200 also contains code pages with blank space (that is, code pages with page numbers 254 and 255) where user-defined output font data is stored. In other words, the user can use the user-defined fonts defined by the user as the output font data of the font group definition. User convenience can therefore be improved.

B. Embodiment 2

Figure 9:
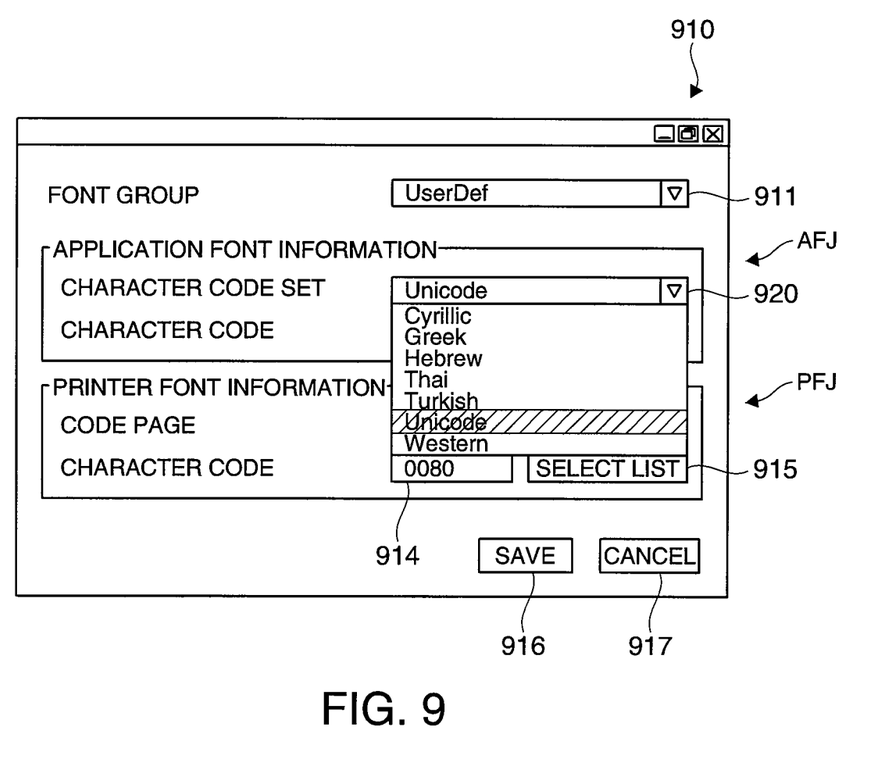
FIG. 9 describes an example of font mapping in a second embodiment of the invention.

FIG. 9 shows an example of font mapping in a second embodiment of the invention. This embodiment differs from the first embodiment shown in FIG. 3 in that a character code set selector 920 enables selecting the character code set, and other aspects of the configuration and operation of this embodiment are the same as the first embodiment.

In the application font information AFJ in this second embodiment, both the desired character code set and desired character can be selected from among all character code sets that can be used in the PC 100. More specifically, all character code sets that can be used on the PC 100 are displayed in the character code set selector 920 as shown in the figure. The user selects a desired character code set from the displayed group of character code sets. The number assigned to the character that the user wishes to register is input to the character code field 912 from among the character codes specified by the character code set.

Figure 10:
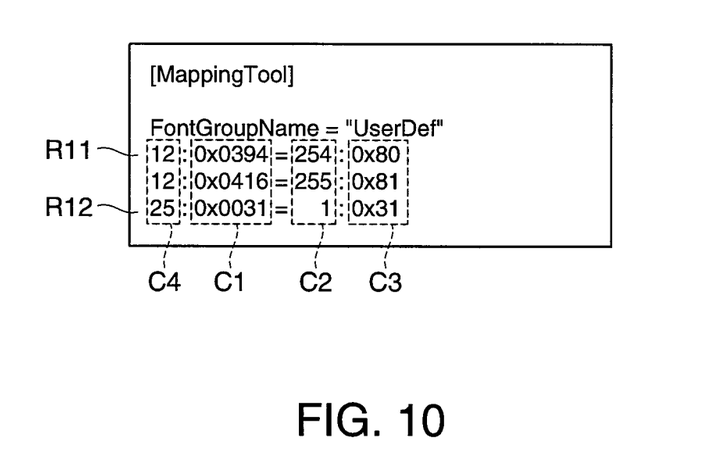
FIG. 10 describes an example of a font map file in the second embodiment of the invention.

FIG. 10 shows an example of a map file in this second embodiment of the invention. This map file differs from the map file shown in the first embodiment in FIG. 5 only in the addition of column C4, and is otherwise identical to the map file described in the first embodiment. An identification number denoting the character code set selected in the character code set selector 920 (FIG. 9) of the application font information AFJ is stored in column C4. More specifically, element R11 says that the character identified by code point 0394 in the Unicode code set (identification number: 12) corresponds to character code 80 on code page 254. Element R12 similarly says that the character stored at code point 0031 in the Cyrillic character code set (identification number: 25) is mapped to character code 31 on code page 1.

Figure 11:
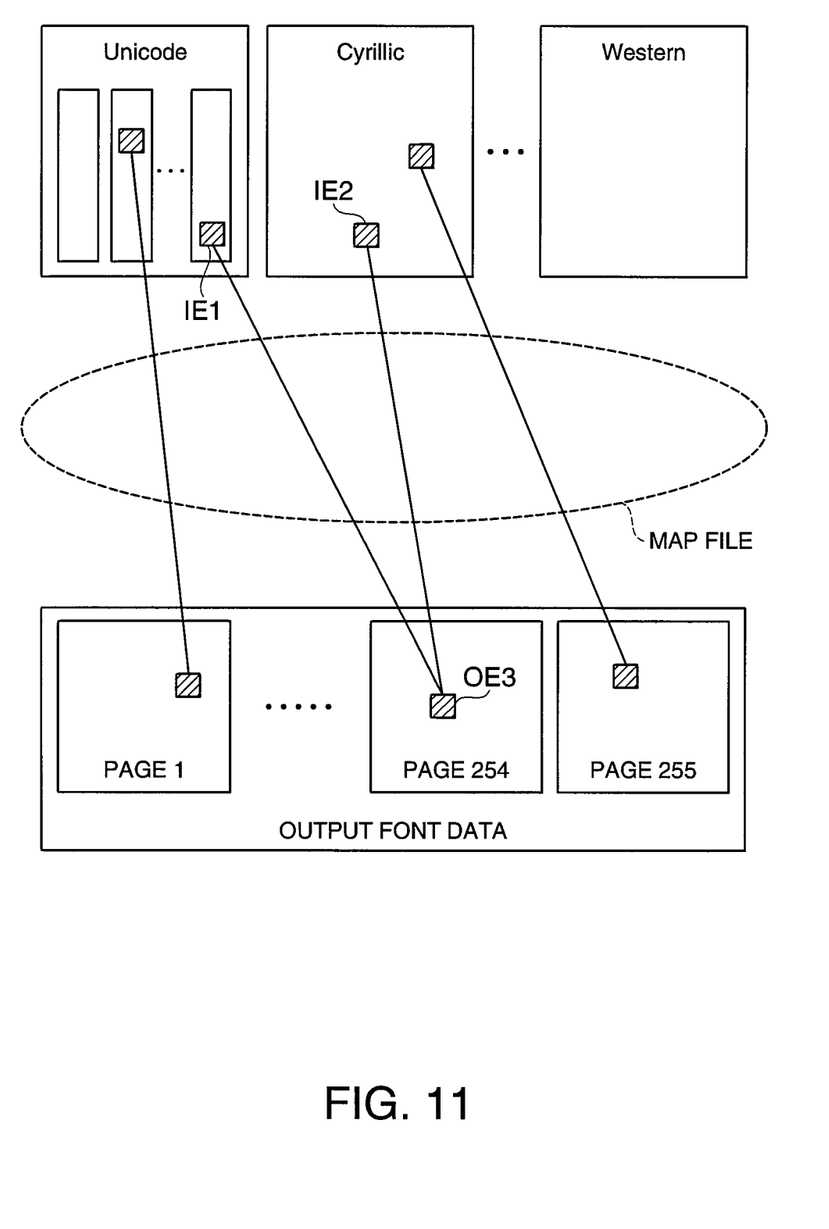
FIG. 11 conceptually describes the effect of the second embodiment.

FIG. 11 conceptually describes the effect of the second embodiment.

In the second embodiment as shown in FIG. 11, output to the printer 200 is controlled using a font group definition file (map file) containing a many-to-many relationship between the character codes of all character code sets that can be used in the PC 100 and the code pages storing the output font data used in the printer 200. As a result, data on the PC 100 can be output using the output font data of the printer 200 with no relationship to the type of the character code set used. In addition, as shown in FIG. 11, plural characters IE1, 1E2 belonging to different character code sets can be mapped to a single output font OE3 in the map file. As a result, because a specific Cyrillic language character in Unicode and the same character contained in the Cyrillic character code set can be defined in the same font group definition file, user convenience can be improved.

C. Embodiment 3

Figure 12:
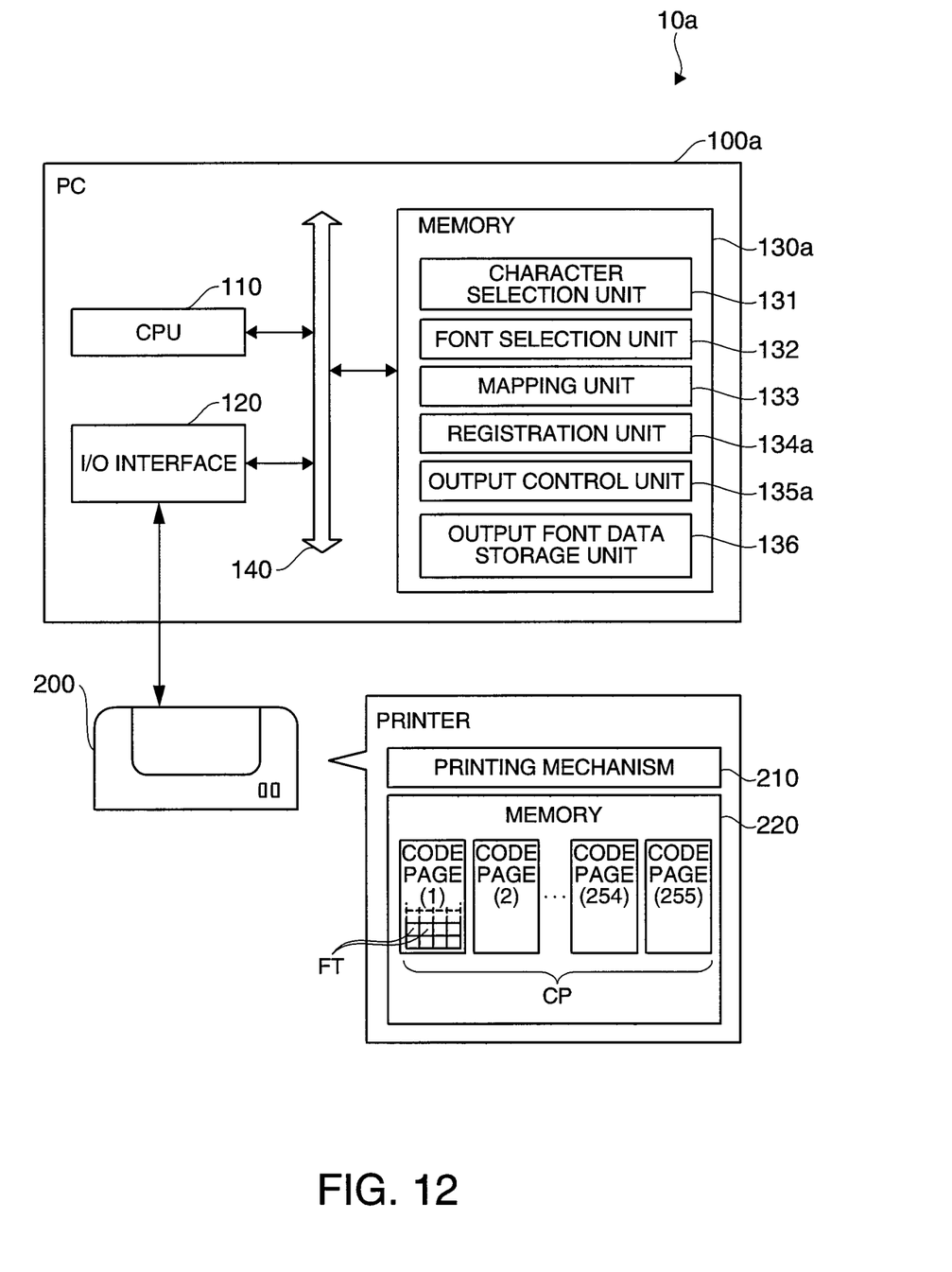
FIG. 12 is a block diagram of a printing system according to a third embodiment of the invention.

FIG. 12 is a block diagram of a printing system 10a according to a third embodiment of the invention. The differences between this embodiment and the first embodiment shown in FIG. 1 are that an output font data storage unit 136 is also provided in memory 130a, and the operation of the registration unit 134a and output control unit 135a, and other aspects of its configuration and operation are the same as in the first embodiment. The output font data storage unit 136 includes ROM or RAM not shown, and stores user-defined output font data.

Figure 13:
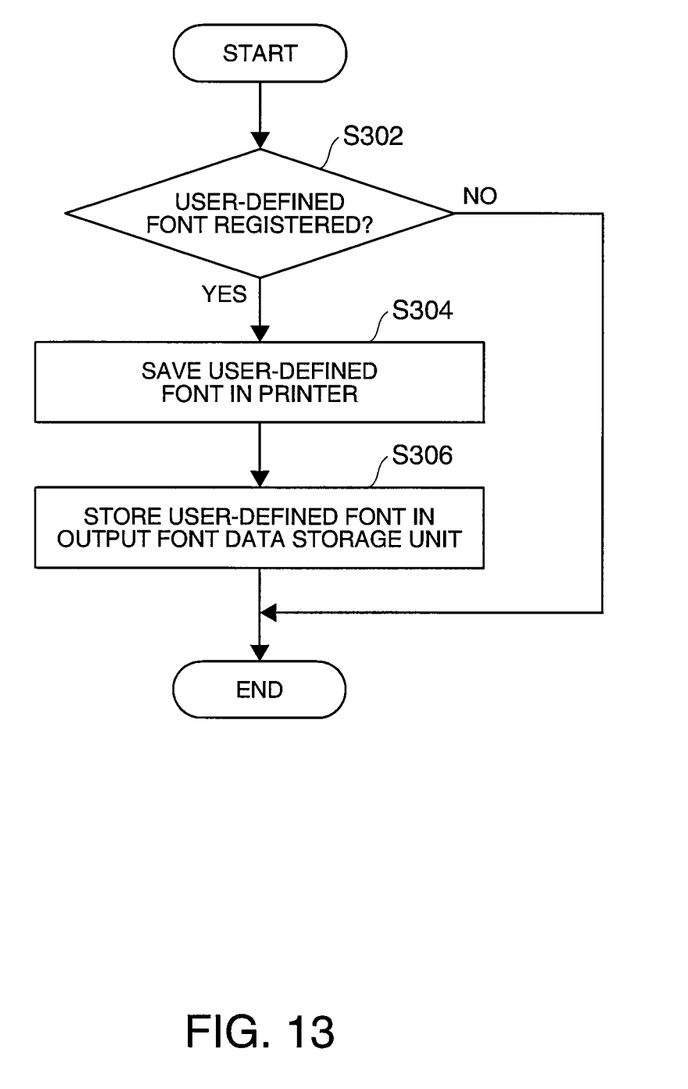
FIG. 13 is a flow chart of a procedure for registering user-defined output font data in the third embodiment of the invention.

FIG. 13 is a flow chart describing the process of registering user-defined output font data in this third embodiment of the invention. When the save button 916 shown in FIG. 4 is pressed, the registration unit 134a determines if there is user-defined output font data to register (step S302). More specifically, the registration unit 134a determines there is user-defined output font data to save if data was input to the registered font data block FI in FIG. 4. If there is no user-defined output font data to save, the process ends. If there is user-defined output font data to register, the registration unit 134a sends the registration command described with reference to FIG. 4 to the printer 200 (step S304). Then in step S306 the registration unit 134a causes the output font data storage unit 136 to store the user-defined output font data.

Figure 14:
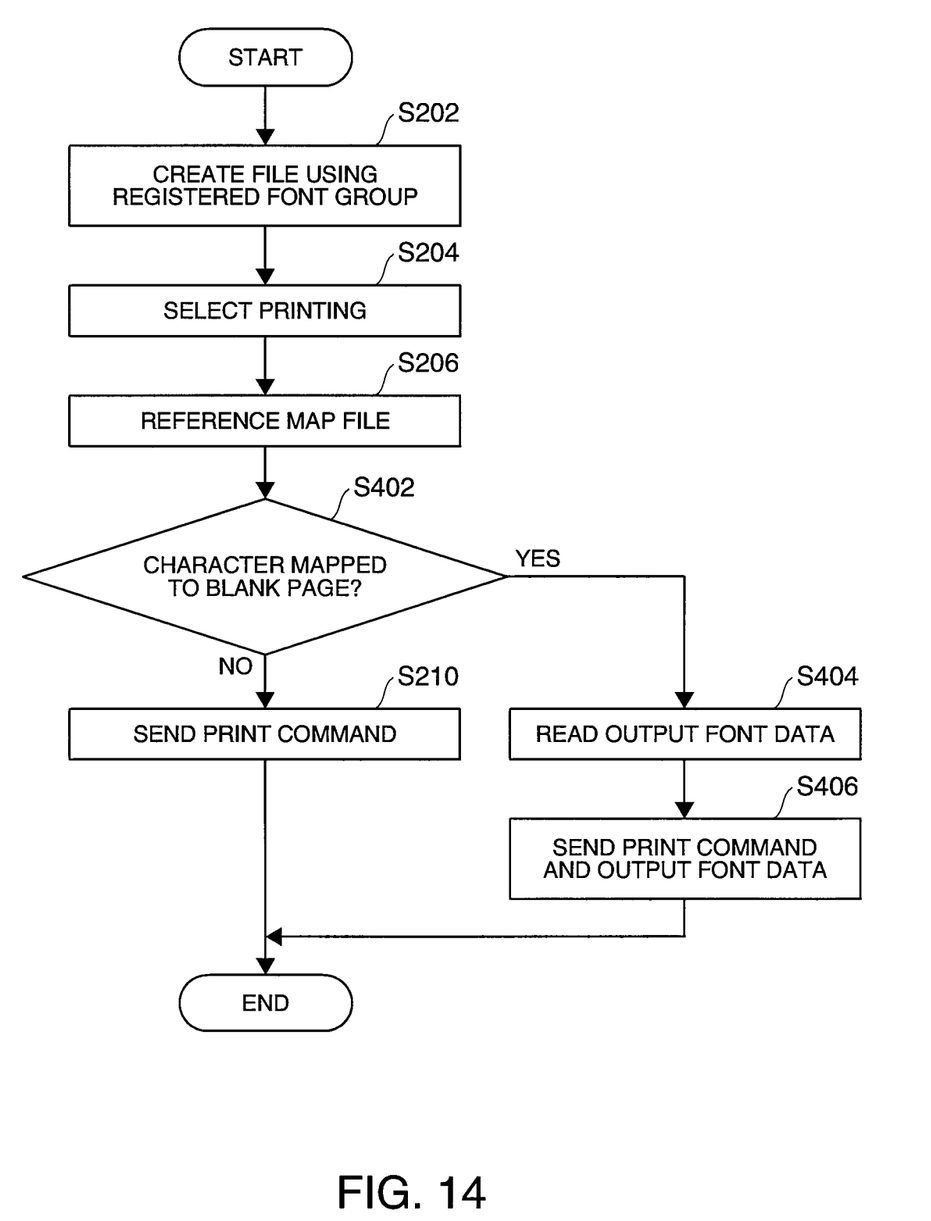
FIG. 14 is a flow chart describing the printing process in a third embodiment of the invention.

FIG. 14 is a flow chart describing the printing process in the third embodiment of the invention. This process differs from the process of the first embodiment shown in FIG. 7 in that step S208 is replaced by step S402, and step S212 is replaced by steps S404 and S406, and other aspects of operation are the same as in the first embodiment.

In step S402 the output control unit 135a determines if a character code denoting a character used in the data output file is mapped to a character on a blank page (pages of page numbers 254 and 255). If there is a character code mapped to a blank page, the output control unit 135a reads the output font data corresponding to the character code mapped to the blank page from the output font data storage unit 136 (step S404). The output font data read in step S404 and a print command in which all character codes used in the data output file are converted to output font data are then sent to the printer 200 (step S406). Note that in steps S404 and S406 the output control unit 135a reads and outputs only the necessary output font data from the output font data storage unit 136 to the printer 200. However, the entire code page in which the required output font data is contained may also be sent to the printer 200.

As a result, if a character code representing a character used in the data output file is mapped to a blank page, the user-defined output font data is sent with the print command. Even a printer (such as a printer other than the printer in which the user-defined output font data is stored) that does not contain the user-defined output font data can therefore print using user-defined characters. User convenience can be improved as a result.

D. Other embodiments

The invention is not limited to the embodiments described above and can be varied in many ways without departing from the scope of the accompanying claims. Some examples of such variations are described below.

D1. Variation 1

Printing using a printer is described in the foregoing embodiments as an example of outputting information using a map file. The invention is not limited to printing using a printer, however, and can output in various ways. For example, information may be presented on a display using a map file.

D2. Variation 2

In the embodiments described above the user is described as specifying all of the application font information AFJ and the printer font information PFJ. However, the selection methods used by the character selection unit and the font selection unit are not limited to the foregoing embodiments, and any desirable method may be used. For example, when there is input to the application font information AFJ and the code page is specified in the printer font information PFJ, the number identifying the location of the output font data corresponding to the selected character (that is, the character selected in the application font information AFJ) in the specified code page may be automatically entered by default. This is desirable because it improves user convenience.

D3. Variation 3

The code pages identified by page numbers 254 and 255 are predefined in the foregoing embodiments as blank pages. However, blank pages may be disposed at any desired location in the code pages. Blank pages may also be omitted.

D4. Variation 4

In the third embodiment above user-defined output font data is stored in an output font data storage unit. However, all output font data stored in the printer may be stored therein instead of storing only user-defined output font data. Yet further, both the print command and the output font data are sent to the printer when there is a character mapped to a blank page in step S402 in FIG. 14. However, as described in step S208 in FIG. 7, a configuration that sends both a print command and output font data to the printer when the map file does not map output font data for the character codes of all characters that are used in the data output file. The output font data that is sent in this configuration may be sent in the required output font data units, or by the code page units containing the output font data.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An output control data generating device for controlling an output device comprising:
   a memory; and
   a central processing unit (CPU) that controls the memory to function as:
   a character selection unit that receives a selection of a desired character code set and a user selection of a desired character from a group containing at least one character code set that can be used on the output control data generating device;
   a font selection unit that receives a selection of output font data, which is information for outputting the selected character to the output device, from among a plurality of different font groups disposed to the output device;
   a mapping unit that produces a font group definition file that stores the selected character mapped to the output font data; and
   an output control unit that controls output to the output device using the font group definition file;
   wherein the plurality of different font groups is divided into a plurality of code pages corresponding to the plurality of font groups, and the font group definition file includes code page information;
   wherein the output control unit controls output to a printing device used as the output device by referencing the font group definition file, finding the output font data to which is mapped the character used in the data to be output, and asserting a print command that converts the characters used in the data to be output to the output font data; and
   wherein the CPU controls a registration unit that receives input of user-defined output font data from an input means of the output control data generating device, and stores the input output font data on a blank page, which is a predefined empty storage space in the code pages.

2. The output control data generating device described in claim 1, further comprising:
   an output font data storage unit that stores the user-defined output font data;
   wherein the registration unit also stores the output font data that was input in the output font data storage unit, and the output control unit also sends the output font data mapped to the character stored in the output font data storage unit together with the print command to the printing device when the character used in the data to be output is data mapped to the blank page.

3. The output control data generating device described in claim 1, wherein:
   the font group definition file is stored in a storage area in the output control unit.

4. The output control data generating device described in claim 1, wherein:
   the code page is stored in a storage area in the printing device.

5. The output control data generating device described in claim 1, wherein:
   the selection of the desired character code set is a user selection.

6. The output control data generating device described in claim 1, wherein:
   the selection of the desired character code set is an automatic selection based on the user selection of the desired character.

7. The output control data generating device described in claim 1, wherein:
   the CPU causes a window to be displayed to a user, the selection of the desired character being input by the user to the window.

8. The output control data generating device described in claim 7, wherein:
   the CPU causes the window to be displayed in response to a font mapping request from the user.

9. A non-transitory recording medium having stored thereon a computer program for controlling an output device, the program comprising:
   a function that receives a selection of a desired character code set and a user selection of a desired character from a group containing at least one character code set;
   a function that receives a selection of output font data, which is information for outputting the selected character to the output device, from among a plurality of different font groups disposed to the output device;
   a function that produces a font group definition file that stores the selected character mapped to the output font data; and a function that controls output to the output device using the font group definition file; wherein:
the plurality of different font groups is divided into a plurality of code pages corresponding to the plurality of font groups, and the font group definition file includes code page information; and
the program further comprising:
a function that controls output to a printing device used as the output device by referencing the font group definition file,
a function that finds the output font data to which is mapped the character used in the data to be output, and
a function that asserts a print command that converts the characters used in the data to be output to the output font data,
a function that receives input of user-defined output font data, and
a function that stores the input output font data on a blank page, which is a predefined empty storage space in the code pages.

10. An output control data generating method for controlling an output device, comprising steps of:
receiving a selection of a desired character code set and a user selection of a desired character from a group containing at least one character code set;
receiving a selection of output font data, which is information for outputting the selected character to the output device, from among a plurality of different font groups disposed to the output device;
producing a font group definition file that stores the selected character mapped to the output font data;
controlling output to the output device using the font group definition file; wherein:
the plurality of different font groups is divided into a plurality of code pages corresponding to the plurality of font groups, and the font group definition file includes code page information; and
further comprising steps of:
controlling output to a printing device used as the output device by referencing the font group definition file,
finding the output font data to which is mapped the character used in the data to be output,
asserting a print command that converts the characters used in the data to be output to the output font data,
receiving input of user-defined output font data, and
storing the input output font data on a blank page, which is a predefined empty storage space in the code pages.

11. The output control data generating method described in claim 10, further comprising steps of:
storing the user-defined output font data;
storing the output font data that was input, and
sending the output font data mapped to the character with the print command to the printing device when the character used in the data to be output is data mapped to the blank page.

12. An output control data generating device for controlling an output device comprising:
a memory; and
a central processing unit (CPU) that controls the memory to function as:
a character selection unit that receives a selection of a desired character code set and a desired character from a group containing at least one character code set that can be used on the output control data generating device;
a font selection unit that receives a selection of output font data, which is information for outputting the selected character to the output device, from among a plurality of different font groups disposed to the output device;
a mapping unit that produces a font group definition file that stores the selected character mapped to the output font data; and
an output control unit that controls output to the output device using the font group definition file; wherein
the plurality of different font groups is divided into a plurality of code pages corresponding to the plurality of font groups, and the font group definition file includes code page information;
the output control unit controls output to a printing device used as the output device by referencing the font group definition file, finding the output font data to which is mapped the character used in the data to be output, and asserting a print command that converts the characters used in the data to be output to the output font data; and
the CPU executes a registration unit that receives input of user-defined output font data from an input means of the output control data generating device, and stores the input output font data on a blank page, which is a predefined empty storage space in the code pages.

13. The output control data generating device described in claim 12, further comprising:
an output font data storage unit that stores the user-defined output font data;
wherein the registration unit also stores the output font data that was input in the output font data storage unit, and the output control unit also sends the output font data mapped to the character stored in the output font data storage unit together with the print command to the printing device when the character used in the data to be output is data mapped to the blank page.

14. An output control data generating method, comprising steps of:
receiving a selection of a desired character code set and a desired character from a group containing at least one character code set;
receiving a selection of output font data, which is information for outputting the selected character to the output device, from among a plurality of different font groups disposed to the output device;
producing a font group definition file that stores the selected character mapped to the output font data; and
controlling output to the output device using the font group definition file; wherein:
the plurality of different font groups is divided into a plurality of code pages corresponding to the plurality of font groups, and the font group definition file includes code page information; and
further comprising steps of:
controlling output to a printing device used as the output device by referencing the font group definition file,
finding the output font data to which is mapped the character used in the data to be output,
asserting a print command that converts the characters used in the data to be output to the output font data,
receiving input of user-defined output font data from an input means of the output control data generating device, and
storing the input output font data on a blank page, which is a predefined empty storage space in the code pages.

15. The output control data generating method described in claim 14, further comprising steps of:
storing the user-defined output font data;
storing the output font data that was input in the output font data storage unit; and sending the output font data mapped to the character with the print command to the printing device when the character used in the data to be output is data mapped to the blank page.

* * * * *